United States Patent [19]

Shinada

[11] Patent Number: 4,681,817
[45] Date of Patent: Jul. 21, 1987

[54] PISTON RING

[75] Inventor: Manabu Shinada, Kashiwazaki, Japan

[73] Assignee: Kabushiki Kaisha Riken, Tokyo, Japan

[21] Appl. No.: 812,124

[22] Filed: Dec. 23, 1985

[30] Foreign Application Priority Data

Dec. 24, 1984 [JP] Japan .................................. 59-270736
Jan. 31, 1985 [JP] Japan .................................. 60-17575

[51] Int. Cl.⁴ ................................................ B22F 7/00
[52] U.S. Cl. ................................ 428/549; 277/235 A; 277/DIG. 6; 428/552; 428/553; 428/679
[58] Field of Search .................... 277/235 A, DIG. 6; 428/549, 552, 553, 679

[56] References Cited

U.S. PATENT DOCUMENTS

| | | | |
|---|---|---|---|
| 3,988,119 | 10/1976 | Takahashi et al. | 428/566 |
| 4,435,482 | 3/1984 | Futamura et al. | 428/553 |
| 4,505,988 | 3/1985 | Urano et al. | 428/569 |
| 4,509,722 | 4/1985 | Ebihara | 428/548 |
| 4,578,317 | 3/1986 | Nakamura | 428/547 |

Primary Examiner—Stephen J. Lechert, Jr.
Attorney, Agent, or Firm—Mason, Kolehmainen, Rathburn and Wyss

[57] ABSTRACT

This piston ring has a composite plated layer at least on its outwardly facing sliding surface. The composite plated layer includes a quantity of hard particles of a granular dispersion material dispersed in a matrix of matrix metal consisting essentially of nickel-cobalt-phosphorous alloy containing about 10% to about 40% by weight of cobalt, about 2% to about 15% by weight of phosphorous, and remainder substantially nickel. It may also further include a quantity of lubricating particles having average particle diameter of from about 0.5 microns to about 20 microns and having a content of from about 5% to about 3% by volume. Yet further, the composite plated layer may include a quantity of short fibrous dispersion material dispersed in the matrix of matrix metal. Thereby, the wear on the piston ring, and also the wear on the cylinder bore in which it slides, are reduced.

9 Claims, 6 Drawing Figures

Table 4

No. 3a

No. 3b

No. 2a

No. 2b

No. 1a

No. 1b

Silicon nitride particles, Ni-P plating

Mo-flame spraying

Hard chrome plating

μm 20 15 10 5 0 10 20 30 40 50 μm

WEAR OF CYLINDER BORE   WEAR OF PISTON RING

PISTON RING

BACKGROUND OF THE INVENTION

This invention relates to a piston ring with an improved wear resistance and scuff resistance, and in particular relates to a piston ring having an electroplated layer comprising dispersed particles in a matrix of nickcobalt-phosphorous alloy.

In the prior art it is per se known to utilize hard chrome plating in order to improve the wear resistance of a piston ring which undergoes sliding motion at high speed in a cylinder bore, but the disadvantages of doing this are, not only that plating this hard chrome plating onto to the piston ring takes a long time, but also the wear resistance, the scuff resistance, and the corrosion resistance of the piston ring suffer from some problems when the piston ring is used in an engine which burns a leaded gasoline or is subjected to high load operation.

In order to solve such problems, there is a per se known plating process, popularly called the "composite plating process" or the "dispersion plating process", according to which wear resistant particles such as nitrides, carbides, and oxides of a metal are included in a matrix of matrix metal containing nickel and phosphorous, for instance.

According to such a plating process, by appropriately selecting the material, the size, and the dispersion amount of the particles to be dispersed, it is possible to form a plated layer which is superior in wear resistance, scuff resistance, and corrosion resistance, and this process has nowadays started to be used on cylinders and piston rings.

The wear resistance particles which are dispersed in such a composite plated layer improve the wear resistance of the plated layer, but if the dispersion amount is excessive the mechanical strength of the plated layer may be reduced. On the other hand, the addition of phosphorous to the matrix of the composite plated layer can improve the hardness, the wear resistance, and the corrosion resistance of the plated layer when it is subjected to heat processing, but when the content of the phosphorous is excessive the matrix may become more brittle, and the impact strength of the plated layer may be reduced, thereby giving rise to the problems of the plated layer peeling off during use.

Furthermore, a conventional composite plated layer has problems such as wearing out the mating member along which it slides, which in the case of a piston ring is of course the cylinder bore in which it is fitted.

SUMMARY OF THE INVENTION

A primary object of this invention is to eliminate the above detailed problems, and others, relating to the conventional composite plated layer, and to provide a piston ring having a composite plated layer which is superior in wear resistance, scuff resistance, and corrosion resistance with regard to at least its sliding surface, and yet which does not unduly wear out the cylinder bore along which it slides.

Another object of this invention is to provide a piston ring having a plated layer, in which a dispersion material is dispersed within a matrix of nickel-cobalt-phosphorous alloy, which is suitable for use in an engine which burns a leaded gasoline or which is subjected to high load.

Yet another object of this invention is to provide a piston ring having as its sliding surface a composite plated layer in which a granular or fibrous dispersion material is dispersed within a matrix of nickel-cobalt-phosphorous alloy.

According to the most generaly aspect of the present invention, these and other objects are accomplished by a piston ring comprising a composite plated layer at least on its peripheral sliding surface, said composite plated layer comprising a quantity of hard particles of a granular dispersion material dispersed in a matrix of matrix metal consisting essentially of nickel-cobalt-phosphorous alloy containing about 10% to about 40% by weight of cobalt, about 2% to about 15% by weight of phosphorous, and remainder substantially nickel.

According to such a composition, the piston ring has an improved performance, both with regard to wear on it and with regard to wear on the cylinder bore in which it slides, as will be attested by the following description of embodiments.

Further, according to a more particular aspect of the present invention, these and other objects are more particularly and concretely accomplished by a piston ring as described above, wherein said composite plated layer further comprises a quantity of short fibrous dispersion material dispersed in said matrix of matrix metal.

According to such a composition, the short fibrous dispersion material acts to further strengthen the plated layer and to improve its wear characteristics, as well as to improve its cracking and flaking characteristics.

Further, according to yet a more particular aspect of the present invention, these and other objects are yet more particularly and concretely accomplished by a piston ring as described above, said granular dispersion material further comprising a quantity of lubricating particles having average particle diameter of from about 0.5 microns to about 20 microns and having a content of from about 5% to about 35% by volume.

According to such a composition, the lubricating particles are particularly effective for reducing the wear on the cylinder bore in which the piston slides, as will be made clear from the results of the tests which will be detailed hereinafter.

BRIEF DESCRIPTION OF THE DRAWINGS

The present invention will now be shown and described with reference to preferred embodiments thereof, and with reference to the illustrative drawings, which however are all of them given purely for the purposes of explanation and exemplification only, and are none of them intended to be limitative of the scope of the present invention in any way. In the drawings, like parts and spaces and so on are denoted by like reference symbols in the various figures thereof; in the description, spatial terms are to be everywhere understood in terms of the relevant figure; and.

DESCRIPTION OF THE PREFERRED EMBODIMENTS

The present invention will now be described with reference to the preferred embodiments thereof, and with reference to the appended drawings.

The dispersion plating process according to which the piston ring of this invention is manufactured comprises the step of forming a plated layer on the surface of the piston ring by dipping it into a plating solution and thus forming the plated layer by an electroplating or electroless plating process. In other words, hard wear resistance particles, serving as a dispersion material, are suspended in a plating solution for nickel-cobalt-phosphorous alloy plating, and optionally also lubricating material particles are suspended in said plating solution, or alternatively and optionally short fibrous dispersion material is suspended in said plating solution; and the piston ring is dipped into the plating solution. Thus, a plated layer is formed on the surface of the piston ring, in which these dispersion materials are dispersed in a matrix metal consisting essentially of of nickel-cobalt-phosphorous alloy.

Figure 1:
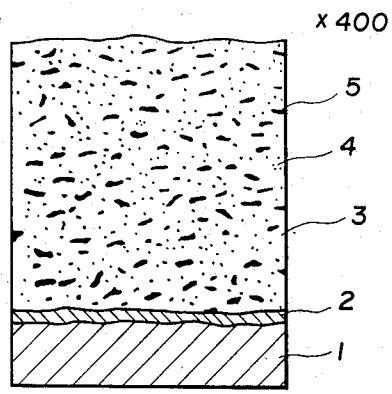
FIG. 1 is an exemplary illustrative schematic sectional view of the structure of a portion of a surface layer formed on a preferred embodiment of the piston ring of the present invention, shown at a magnification of about 400×.

In FIG. 1, which is an enlarged schematic sectional view showing an exemplary structure for such a plated layer in a preferred embodiment of the present invention, a nickel strike plated intermediate layer 2 is formed on a piston ring blank 1, and a plated layer 3, in which wear resistant particles 4 and lubricating particles 5 are dispersed in a matrix metal consisting essentially of nickel-cobalt-phsophorous alloy, is formed over said strike plated intermediate layer 2.

It has been ascertained that phosphorous contained in the plated layer increases the hardness of the matrix of matrix metal alloy by hardening heat process and produces an excellent effect in improving wear resistance and corrosion resistance. This effect has been ascertained to be small when the content of phosphorous in the matrix metal alloy is less than 2% by weight, and if the content is over 15% by weight it has been ascertained that the matrix metal alloy becomes brittle and the impact strength and the adhesion characteristic of the plated layer are imparied. Therefore, according to the present invention, the content of phosphorous in the matrix metal alloy is preferred to be in the range of from about 2% to about 15% by weight, and a more preferable range is from about 3% to about 10% by weight.

Further, it has been ascertained that, when cobalt is added to the matrix metal alloy, not only the scuff resistance and corrosion resistance but also the collapse strength and the fatigue strength of said matrix metal alloy are improved. When the content of cobalt is less than 10%, it has been ascertained that the above mentioned improvement will not be appreciably obtained, and when the content of cobalt exceeds 40% it has been ascertained that there is no substantial further improvement with increasing coablt content. Therefore, according to the present invention, the content of cobalt in the matrix metal alloy is preferred to be in the range of from about 10% to about 40% by weight, and a more preferable range is from about 10% to about 30% by weight.

According to the present invention, the rest of the matrix alloy is substantially nickel, and the content of nickel is therefore from about 45% to about 88% by weight. It has been found that such use of nickel has the effect of improving the corrosion resistance and oxidization resistance at high temperature of the plated layer.

The hard wear resistant particles to be dispersed in the matrix may be particles of alumina, silicon nitride, silicon carbide, titanium boride, titanium carbide, or other metal nitrides, metal carbides, metal oxides, or the like.

When the particle diameter of the hard wear resistant dispersed particles is less than about 0.3 microns, or when their content in the plated layer is less than about 5% by volume, it has been ascertained that there will be very little effect in improving the wear resistance, and when the particle diameter becomes greater than about 10 microns or their content exceeds about 30% by volume it has been ascertained that the strength of the plated layer tends to be reduced. Therefore, according to the present invention, the average diameter of the wear resistant particles is preferred to be from about 0.3 microns to about 10 microns, while their content is preferred to be from about 5% to about 30% by volume; and it has further been ascertained that it is even more preferable for their average diameter to be from 0.5 micron to about 5 microns, and for their content to be from about 15% to about 25% by volume. By the dispersion of such hard wear resistant particles in the matrix metal of the plated layer, the wear resistance and the scuff resistance of the plated layer on the piston ring are improved.

Further, as a possible specialization of the present invention, it is possible to disperse lubricating particles, in addition to the wear resistant particles, within the matrix metal of the plated layer, and by the dispersion of such lubricating particles it is possible to achieve a further improvement of wear resistance and in particular also a reduction of the wear on the mating member, i.e. the cylinder bore in which the piston ring slides. Typical materials for the lubricating particles may for instance be molybdenum disulphide, graphite fluoride, boron nitride, graphite, mica, Teflon, and other solid lubricating materials of low frictional coeffient which have the property of cleavage.

The appropriate average particle size of the lubricating particles which are to be dispersed in the matrix of matrix metal may vary depending upon the material which is used for said lubricating particles, but it has been ascertained that there will be little beneficial effect of the addition of such lubricating particles if their average diameter is less than about 0.5 microns, or if their content in the plated layer is less than about 5% by volume; while on the other hand it has further been ascertained that the mechanical strength of the plated layer will be reduced, thereby possibly causing the peeling off of the plated layer during use, if the average diameter of such lubricating particles is greater than about 20 microns, or if their content is greater than about 35% by volume. Therefore, according to the present invention, preferably the average diameter of the lubricating particles is from about 0.5 microns to about 20 microns, and their content is from about 5% to about 35% by volume; and further it has been ascertained that it is even more preferable for the average diameter of the lubricating particles to be from about 1 micron to about 10 microns, and for their content to be from about 5% to about 30% by volume.

The total volume of the wear resistant particle and the lubricant particles within the matrix is desired, according to the present invention, as ascertained from the results of various tests, to be less than or equal to 40% by volume, from the viewpoint of maintaining good mechanical strength for the plated layer.

Further, it is optionally possible to disperse short fibers or so called whiskers in the matrix metal of the plated layer, in addition to the wear resistant particles and the optionally provided lubricating particles, and it has been found that by dispersing such short fibrous material in the plated layer the brittleness of said plated layer can be improved.

According to the results of various researches conducted by the present inventive entity, it has been determined that it is preferable for the average diameter of the fibers of the short fibrous material to be from about 0.05 microns to about 1.0 microns. Further, it has been determined that it is preferable for the ratio of the average length L of said fibers of said short fibrous material to their average diameter D to be from about 50 to about 200, since if this ratio L/D is equal to or less than about 10 then the configuration of said short fibrous material becomes close to that of particles and the effect conferred by them of improving the plated layer is small; while, on the other hand, if their length is great and thus the ratio L/D is great, said short fibers are not easily uniformly dispersed in the plated layer.

Figure 3:
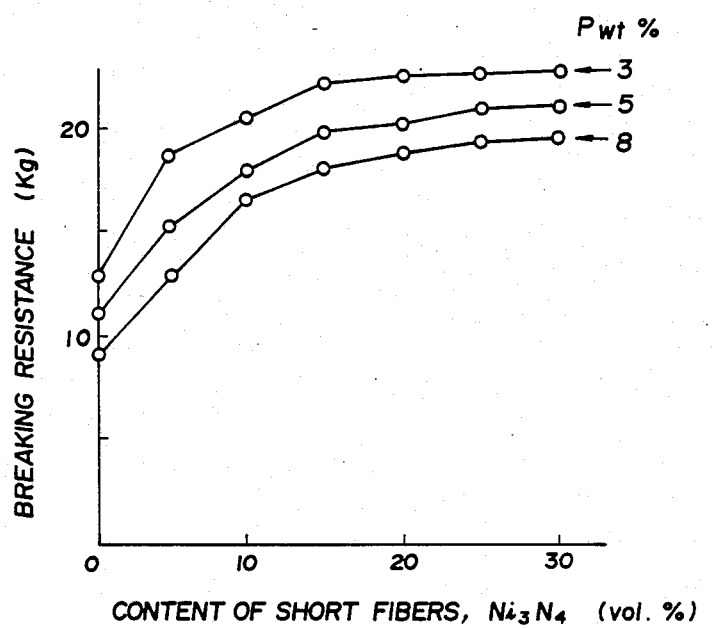
FIG. 3 is a graph showing the relationship between the content of short fibers dispersed in a layer plated on a piston ring according to the present invention and the breaking resistance of said plated layer, as determined by using the test apparatus shown in FIG. 6.
Figure 6:
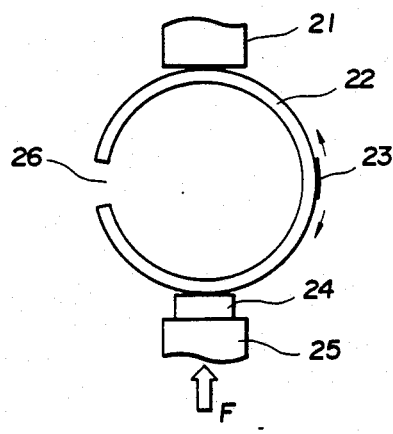
FIG. 6 is a vertical side view showing how the breaking resistance test for the plated layer, the results of which are shown in FIG. 3, was conducted.

Also, from the point of view of strength, adhesion, and quality of the plated layer, it has been determined to be preferable for the content of these short fibers in the plated layer to be from about 5% to about 20% by volume. Such short fibers for example may consist essentially of metal nitrides or metal carbides such as silicon carbide ($Si_3N_4$). FIG. 3 shows some test results relating to the relationship between the content of short fibrous material and the breaking resistance of the plated layer. As a test piece, a piston ring 22 was used which was coated with a composite plating on its outer peripheral surface by using a plating solution which was adjusted to give a matrix alloy for said plated layer containing about 65% Ni, about 30% Co, and about 5% P, and the silicon nitride short fibrous material was suspended in said plating solution. And as shown in FIG. 6 the piston ring 22 was held between a fixed head 21 and a load cell 24 placed on a movable head 25, with the gap 26 of the piston ring on one side. Then as the movable head 25 was raised from the level of the figure, the test piston ring 22 was compressed so as to narrow its gap 26, which eventually caused cracking in the plated layer on the outer circumferential surface opposite to the piston ring gap 26. A strain gauge 23 was adhered to said outer circumferential surface opposite to the piston ring gap 26, and was connected to a strain meter. Since the magnitude of strain changed abruptly when a crack developed, the pressure of the load cell 24 at such a time was recorded on a recording device, and the breaking resistances of the plated layers on various sample rings were determined from such readings.

The piston rings which were used for this test had nominal diameter, width, and thickness of 94×3×3.5 mm, and their body material was JIS.FCD70 (which corresponds to ASTM.A536.100-70-03), while the thickness of the plated layers on their outer circumferences was 0.1 mm.

From FIG. 3, it can be seen that by dispersing silicon nitride ($Si_3N_4$) fibers in the plated layer the breaking resistance could be as much as doubled, but when the content was equal to or less than 5% by volume the effect thereof was insufficient, while when the content exceeded 20% by volume there was no significant further change in its effect for increasing the breaking resistance with further increase thereof. When the amount of dispersed short fibrous material was excessive, it was further found that holes tended to develop in the matrix of matrix metal, and the surface of the plated layer tended to be coarse.

EMBODIMENTS

Figure 4:
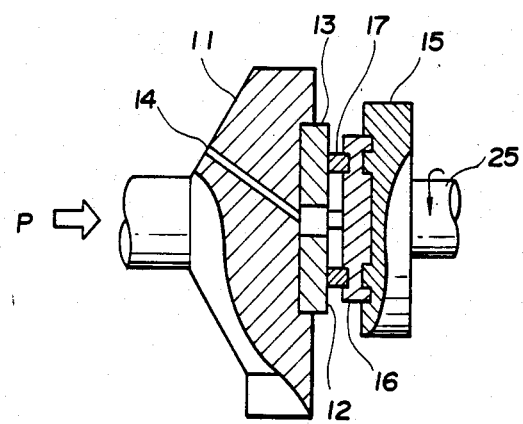
FIG. 4 and FIG. 5 are a partially broken away side view and a front view showing an essential portion of a testing machine for determining wear and scuff characteristics of test pieces.
Figure 5:
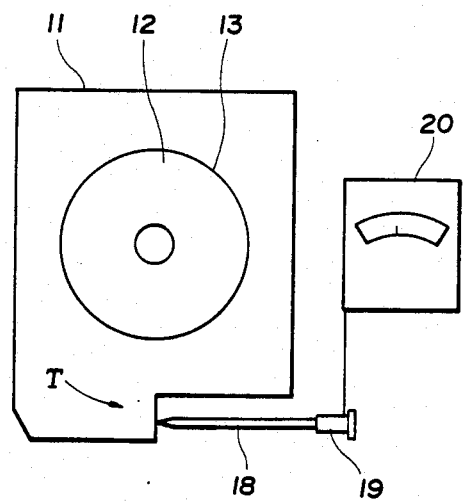

Now, concrete embodiments of this invention and the results of various tests will be described. First, the testing machine which was used for the wear test and the scuff test described hereinafter will be explained in detail. This wear testing machine is schematically shown in FIGS. 4 and 5, and it comprised a test disk 13 which was detachably mounted on a holder 11. The test disk 13 was made of cast iron (JIS.FC25, which corresponds to ASTM.A48. CLASS No. 40), which is typically used as material for a cylinder bore in an engine, and its sliding surface 12 was hone finished. To the central part of the sliding surface 12 of the test disk 13 was supplied lubricating oil by way of an oil injection hole 14 communicating from the rear side of said disk 13.

The holder 11 received a rightward pressing force P as shown in the drawing from a hydraulic device which is not shown in the drawing at a certain predetermined pressure.

The surface of a test piece holder 16 mounted on a rotor 15 opposite to the disk 13 was provided with four mounting holes at equal intervals around a circle which was concentric with a rotational shaft 25, and a test piece 17 was mounted in each of these four mounting holes.

The test pieces 17 were thus rotated by rotation of the rotational shaft 25, which was driven by a drive device which is not shown in the drawing, at a certain speed, while sliding their end surfaces, which were five millimeters square, along the cooperating portion of the sliding surface 12 of the test disk 13. The test was conducted while lubricating oil at a certain temperature was being supplied to the sliding surface 12 through the oil injection hole 14 formed through the holder 11.

The wear test was conducted by comparing the wear amounts of the test pieces 17 and the test disk 13 when the piece 17 was slid along the disk 13 over a certain sliding distance under a certain mutual pressure therebetween by the rotor 15 being rotated.

The scuff test was conducted as now described. the rotor 15 rotated, a torque T, as shown in the drawing, was applied to the holder 11 due to the friction between the test piece 17 and the sliding surface 12 of the disk 13, and this torque T acted upon the load cell 19 by way of a spindle 18. This torque T was increased proportionally to the increase of the pressure P, and was abruptly increased when scuffing between the test piece 17 and the sliding surface 12 of the disk 13 occurred. Therefore, the level of scuff resistance could be evaluated from the pressure P when the torque T underwent an abrupt increase, by reading the change in the torque T due to the change in the pressure P on a dynamic strain meter 20.

Initially, as a first process, nickel plating of about 5 microns in thickness was performed on the end surfaces, which were 5 mm square, of a number of test pieces 17 made of a type of steel suitable for piston rings (JIS.SKD61, corresponding to ASTM.A681.H13), according to a conventional nickel strike plating process, and then plating of a layer about 120 microns thick of composite material including an alloy of nickel-cobalt-phosphorous was performed on these test pieces 17 as a second process, by electroplating, using the palting solutions defined in the left column of Table 1, which for reasons of typographical convenience is given, along with the other Tables, at the end of this specification and before the claims. The combinations and the compositions of the dispersion material in the plating solutions were as shown in Table 3. Thus, the wear resistant particles were silicon nitride particles (average particle diameter 1 micron), the lubricating material was boron nitride particles (average particle diameter 2 to 3 microns), and the short fibers were silicon nitride short fibers (average diameter 0.2 microns, length 10 to 20 microns).

Further, composite nickel-cobalt-phosphorous plated layers of about 100 microns in thickness were formed on other test pieces 17 under similar conditions by an electroless plating process under the conditions shown in the right column of Table 1. Since the adhesion of the plated layer was excellent according to this electroless nickel-cobalt-phosphorous alloy plating process, it was possible to omit the initial layer of nickel strike plating.

Then, as a third process, the test pieces 17 were hardening processed by being heated at 370° C. for one hour. The heating temperature for this heat hardening process for such a nickel-cobalt-phosphorous alloy plated layer may be generally 200° to 450° C.

Table 1 shows the chemical composition of the plating solution, Table 2 shows the plating conditions, Table 3 shows the kind and the amounts of the dispersion materials in the plating solution, and Table 4 shows the composition of the plated layer and the micro Vickers hardness.

(a) Wear test

In addition to the test pieces obtained under the conditions listed in Tables 1, 2, and 3, for comparison purposes similar tests were conducted on test pieces having hard chrome plating, flame sprayed molybdenum which is excellent in scuffing resistance, and nickel-phosphorous alloy plating not containing cobalt with a quantity of silicon nitride particles dispersed therein.

As a lubricating oil, oil which was prepared by adding about 0.2 gm/liter of dust (JIS Z8901 Grade 2, corresponding to SAE coarse grade) in engine oil SAE No. 30, of a type actually used in an engine which burns leaded gasoline, was supplied from the oil injection hole 14, and, while applying hydraulic pressure P of about 100 kg/cm$^2$ on the holder 11 towards the rotor 15, the rotor 15 was rotated so as to produce a relative speed of from about 3 to about 5 m/sec between the test piece 17 and the test disk 13, and this test was continued until the sliding distance reached 100 km. The test results are shown in Table 5.

According to Table 5, it is apparent that the wear on the test pieces (No. 1a to No. 3b) according to the present invention was reduced to about one half to one third of the wear of the conventional hard chrome plated samples of molybdenum flame sprayed samples, and the wear of the mating member (cast iron) was also reduced to a fraction of its former amount, thus showing that the samples prepared according to the present invention had superior wear resistance and that the benefit obtained by the addition of Co is clear as opposed to the case of an Ni-P alloy composite plated sample which did not contain Co. The samples of the material according to the present invention (No. 2a, No. 2b) to which the lubricating material (boron nitride) was added were found to wear the mating member (cast iron) to a significantly lesser extent. The samples of the present invention (No. 3a, No. 3b) including the short fibrous reinforcing material displayed the least wear amount as far as they themselves were concerned, even though the wear of the mating members was slightly greater.

(b) Scuffing test

The same lubricating oil as that used in the wear test was used, and, while applying by hydraulic means a pressure P of about 40 kg/cm$^2$ on the stator holder 11 towards the rotor, the rotor 15 was rotated for three minutes to produce a relative speed between the test piece 17 and the test disk 13 of about 8 m/sec, and then the pressure was increased in a stepwise manner by 10 kg/cm$^2$ at a time and was maintained for about 3 minutes at each pressure level. The changes in the torque T were recorded on a dynamic strain meter 20 by way of the load cell 19, and the pressure at which the scuffing occurred was determined as the value of the pressure when an abrupt increase in the torque T was recorded. The test results are shown in Table 6.

According to Table 6, the surface pressure at which the scuff occurred on the silicon nitride dispersed Ni-Co-P alloy plated sample was 1.5 times greater than that of the hard chrome plated sample, and was about 10 to 20 kg/cm$^2$ greater than a known molybdenum flame sprayed sample. Furthermore, the sample in which the lubricating boron nitride was dispersed showed about 30 to 40 kg/cm$^2$ greater than that of a molybdenum flame sprayed sample.

The sample in which both silicon nitride particles and silicon nitride short fibers were dispersed showed similar performance as that of a sample in which silicon nitride particles and boron nitride particles were dispersed, and in both cases the present invention was found to be superior by far over the conventional samples.

(c) Engine test

Figure 2:
FIG. 2 is a two sided bar chart, comparing the test results for piston rings (Nos. 1a, 1b, 2a, 2b, 3a, and 3b) each having a layer of nickel-cobalt-phosphorous alloy in which hard particles made of granular dispersion material were dispersed according to the present invention with test results for conventional piston rings, and showing the amount of wear on each ring and the amount of wear on a cylinder bore in which it slide, sustained during an engine tests period.
Figure 2:
Figure 2:
Figure 2:
Figure 2:
Figure 2:
Figure 2:
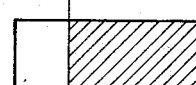
Figure 2:
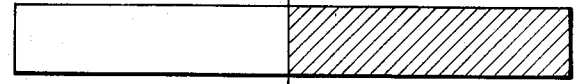
Figure 2:

The composite plating of this invention was applied to an outer peripheral surface of a first compression piston ring made of steel having a nominal diameter of 86 mm, a width of 1.5 mm, and a thickness of 3.3 mm, and was mounted into a four cylinder water cooled engine having a bore diameter of 86 mm. After conducting a high speed durability test at 6200 rpm for 100 hours using a leaded gasoline, the wear amounts of the sliding surface of the piston ring and the internal surface of the cooperating cylinder liner, which was made of cast iron (FC25), were measured. The composition of the matrix in the composite plated layer of the piston ring was 25% Co by weight and 3.5% P by weight, remainder substantially nickel. This test was repeated three times, with the following three kinds of dispersion material being used: (1) 20% by volume of silicon nitride hard particles having an average particle diameter of about 0.8 microns; (2) 20% by volume of silicon nitride hard particles having an average particle diameter of about 0.8 microns and 15% by volume of boron nitride having an average particle diameter of about 3 microns; and (3) 20% by volume of silicon nitride hard particles having an average particle diameter of about 0.8 microns and 15% by volume of silicon nitride short fibers having average length of about 10 to 20 microns and diameter of about 0.2 microns. The test results are shown in the bar chart of FIG. 2. In this bar chart, the test results are compared to those obtained using the comparative test samples which were correspond to the comparative test pieces used in the previously mentioned wear tests, i.e. the hard chrome plated piston ring, the molybdenum flame sprayed piston ring, and the silicon nitride dispersed Ni-P alloy plated piston ring.

The wear on these piston rings according to the present invention was about one fifth as compared to that of the hard chrome plated sample and the molybdenum flame sprayed sample, and the wear of the mating member was about ⅓, thus providing that the piston rings of the present invention had superior wear resistance. And even when the piston rings according to the present invention are compared with the silicon nitride dispersed Ni-P alloy plated sample, the wear of said present invention type rings is seen to have been about a half of the wear on said comparative sample, and the wear on the mating member (the cylinder bore) is seen to have been appreciably less, thereby proving an improvement in wear resistance and demonstrating the effect of adding cobalt. And from FIG. 2 it can also be seen that the sample in which boron nitride was dispersed as a lubricating material was less prone to mating member wear as compared to the sample in which only silicon nitride was dispersed. Furthermore, when both silicon nitride and short fibers were dispersed, the brittleness of the plated layer was improved, and the occurrence of chipping off was reduced.

Although the present invention has been shown and described with reference to the preferred embodiments thereof, and in terms of the illustrative drawings, it should not be considered as being limited thereby, since many alterations could be made in the perhaps purely fortuitous details thereof, but as being defined solely by the scope of the appended claims, which follow after the Tables.

TABLE 1

| Plating solution | (grams/liter) Electroplating | Electroless plating |
|---|---|---|
| Nickel sulfate | 200 | 25 |
| Cobalt sulfate | 30 | 5 |
| Nickel chloride | 30 | — |
| Sodium hypophosphite | 2 | 30 |
| Boric acid | 30 | — |
| Succinic acid (budanedioc acid) | — | 16 |
| Malic acid | — | 24 |

Note: the compositions of the dispersion materials are listed in Table 3.

TABLE 2

| | Electroplating | Electroless plating |
|---|---|---|
| Temperature (°C.) | 50-53 | 90 |
| pH | 4.5 | 4.2 |
| Current density (A/dm$^2$) | 8 | — |
| Plating time (h) | 2 | 5 |

TABLE 3

| Dispersion material | (grams/liter) Test piece no. | | | | | |
|---|---|---|---|---|---|---|
| | 1a | 2a | 3a | 1b | 2b | 3b |
| Silicon nitride particles | 60 | 60 | 60 | 1.5 | 1.5 | 3 |
| Boron nitride particles | 0 | 60 | 0 | 0 | 1.5 | 0 |
| Silicon nitride short fibers | 0 | 0 | 20 | 0 | 0 | 2 |

Nos. 1a, 2a, 3a utilized an electroplating process;
Nos. 1b, 2b, 3b utilized an electroless plating process.

TABLE 4

| Contents | Test piece no. | | | | | | |
|---|---|---|---|---|---|---|---|
| | 1a | 2a | 3a | 1b | 2b | 3b | |
| Nickel | 68 | 68 | 68 | 64 | 64 | 65 | *1 |
| Phosphorous | 8 | 8 | 8 | 12 | 12 | 12 | *1 |
| Cobalt | 20 | 20 | 20 | 20 | 20 | 20 | *1 |
| Silicon nitride particles | 25 | 20 | 20 | 25 | 20 | 20 | *2 |
| Boron nitride particles | 0 | 15 | 0 | 0 | 15 | 0 | *2 |
| Silicon nitride short fibers | 0 | 0 | 16 | 0 | 0 | 14 | *2 |
| Hardness (Hv) | | 950 | | | 1030 | | |

Note: *1 - weight percent
2* - volume percent

TABLE 5

| Surface processing | | Wear (microns) | |
|---|---|---|---|
| | | test piece | mating member |
| hard chrome plating | | 25 | 5 |
| molybdenum flame spraying | | 21 | 16 |
| silicon nitride dispersed Ni—P alloy plating | | 15 | 3 |
| silicon nitride dispersed Ni-Co-P alloy plating | No. 1a | 8 | 2 |
| | No. 1b | 10 | 2 |
| silicon nitride, boron nitride dispersed Ni—Co—P alloy plating | No. 2a | 8 | 1.5 |
| | No. 2b | 10 | 1.5 |
| silicon nitride, silicon nitride short fibers dispersed Ni—Co—P alloy plating | No. 3a | 6 | 3 |
| | No. 3b | 6 | 3 |

TABLE 6

| Surface processing | | Surface pressure when scuff occurred kg/cm$^2$ |
|---|---|---|
| hard chrome plating | | 110 |
| molybdenum flame spraying | | 150 |
| silicon nitride dispersed Ni—P alloy plating | | 160-170 |
| silicon nitride dispersed Ni—Co—P alloy plating | No. 1a | 170-180 |
| | No. 1b | 170-180 |
| silicon nitride, boron nitride dispersed Ni—Co—P alloy plating | No. 2a | 180-190 |
| | No. 2b | 180-190 |
| silicon nitride, silicon nitride short fibers dispersed Ni—Co—P alloy plating | No. 3a | 180-190 |
| | No. 3b | 180-190 |

What is claimed is:

1. A piston ring with a composite plated layer at least on its outer peripheral sliding surface wherein said sliding surface is a wear surface that engages a cylinder wall or the like, said composite plated layer comprising a quantity of hard particles of a granular dispersion material dispersed in a matrix of matrix metal consisting essentially of nickel-cobalt-phosphorous alloy containing about 10% to about 40% by weight of cobalt, about 2% to about 15% by weight of phosphorous, and remainder substantially nickel.

2. A piston ring as defined in claim 1, wherein said composite plated layer further comprises a quantity of short fibrous dispersion material dispersed in said matrix of matrix metal.

3. A piston ring as defined in claim 1, said granular dispersion material consisting essentially of either a carbide, a nitride, or an oxide of a metal, with its particles having average particle diameter of from about 0.3 microns to about 10 microns, and having a content of from about 5% to about 30% by volume.

4. A piston ring as defined in claim 1, said granular dispersion material further comprising a quantity of lubricating particles having average particle diameter of from about 0.5 microns to about 20 microns and having a content of from about 5% to about 35% by volume.

5. A piston ring as defined in claim 3, said granular dispersion material further comprising a quantity of lubricating particles having a average particle diameter of from about 0.5 microns to about 20 microns and having a content of from about 5% to about 35% by volume.

6. A piston ring as defined in claim 2, said granular dispersion material consisting essentially of either a carbide, a nitride, or an oxide of a metal, with its particles having average particle diameter of from about 0.3 microns to about 10 microns, and having a content of from about 5% to about 30% by volume, and said short fibrous dispersion material consisting essentially of short fibers of either a carbide or a nitride of a metal, said fibers having average diameter of from about 0.05 micron to about 1 micron, ratio of length to diameter of from about 50 to about 200, and a content of from about 5% to about 20% by volume.

7. A piston ring as defined in claim 1, said hard particles consisting essentially of silicon nitride ($Si_3N_4$).

8. A piston ring as defined in claim 4, said lubricating particles consisting essentially of boron nitride (BN).

9. A piston ring as defined in claim 5, said lubricating particles consisting essentially of boron nitride (BN).

* * * * *